(12) United States Patent
McColl (10) Patent No.: US 11,378,463 B2
(45) Date of Patent: Jul. 5, 2022

(54) SENSOR MOUNTING ASSEMBLY

(71) Applicant: BREVILLE PTY LIMITED, Alexandria (AU)

(72) Inventor: Nicholas McColl, Randwick (AU)

(73) Assignee: BREVILLE PTY LIMITED, Alexandria (AU)

( * ) Notice: Subject to any disclaimer, the term of this patent is extended or adjusted under 35 U.S.C. 154(b) by 463 days.

(21) Appl. No.: 16/324,104

(22) PCT Filed: Aug. 8, 2017

(86) PCT No.: PCT/AU2017/000162
§ 371 (c)(1),
(2) Date: Feb. 7, 2019

(87) PCT Pub. No.: WO2018/027254
PCT Pub. Date: Feb. 15, 2018

(65) Prior Publication Data
US 2019/0212205 A1    Jul. 11, 2019

(30) Foreign Application Priority Data

Aug. 10, 2016 (AU) .................................. 2016903141

(51) Int. Cl.
*G01K 1/00* (2006.01)
*G01K 13/00* (2021.01)
(Continued)

(52) U.S. Cl.
CPC ................ *G01K 1/14* (2013.01); *A47J 31/44* (2013.01); *A47J 31/4489* (2013.01); *G01K 1/16* (2013.01); *G01K 13/00* (2013.01)

(58) Field of Classification Search
USPC ........................................ 374/208, 141, 163
See application file for complete search history.

(56) References Cited

U.S. PATENT DOCUMENTS 3,668,372 A * 6/1972 Russell ................... H01H 37/36
219/448.15
4,241,289 A * 12/1980 Bowling ............... F24C 15/105
136/221
(Continued)

FOREIGN PATENT DOCUMENTS

CN    102483359 A    5/2012
CN    202891651 U    4/2013
(Continued)

OTHER PUBLICATIONS

International Search Report and Written Opinion for PCT/AU2017/000162, dated Nov. 20, 2017.
(Continued)

*Primary Examiner* — Mirellys Jagan
(74) *Attorney, Agent, or Firm* — Marshall, Gerstein & Borun LLP (57) ABSTRACT

A sensor assembly having a sensor body with a upper surface adjacent an item to aid in detecting the temperature of the item. The sensor assembly includes a diaphragm with a disc portion and stem that has the sensor body. The disc portion enables movement of the upper surface to adapt to the inclination and location of the surface. A spring urges the sensor body into engagement with the surface.

16 Claims, 6 Drawing Sheets

(51) Int. Cl.
*G01K 7/00* (2006.01)
*G01K 1/14* (2021.01)
*A47J 31/44* (2006.01)
*G01K 1/16* (2006.01)

(56) References Cited

U.S. PATENT DOCUMENTS

| | | | | |
|---|---|---|---|---|
| 4,399,351 A * | 8/1983 | Koff | ............ | A47J 27/004 |
| | | | | 219/430 |
| 4,710,611 A * | 12/1987 | Axelson | ............ | F24C 15/105 |
| | | | | 219/448.14 |
| 4,770,545 A * | 9/1988 | Takada | ............ | G01K 1/08 |
| | | | | 374/208 |
| 2014/0048293 A1* | 2/2014 | Luongo | ............ | A62C 3/006 |
| | | | | 169/65 |
| 2014/0157998 A1* | 6/2014 | Roever | ............ | H05B 6/065 |
| | | | | 99/483 |
| 2014/0227401 A1 | 8/2014 | Kounlavong et al. | | |
| 2016/0014849 A1 | 1/2016 | Hegedis et al. | | |
| 2020/0141811 A1* | 5/2020 | Grassia | ............ | G01K 1/14 |

FOREIGN PATENT DOCUMENTS

| | | |
|---|---|---|
| CN | 103335738 A | 10/2013 |
| CN | 103383287 A | 11/2013 |
| CN | 204881904 U | 12/2015 |
| CN | 105342460 A | 2/2016 |
| CN | 105659371 A | 6/2016 |
| DE | 202013005259 U1 | 9/2014 |
| EP | 2036471 A1 | 3/2009 |
| GB | 2400660 A | 10/2004 |
| RU | 2569594 C2 | 11/2015 |
| RU | 2583904 C2 | 5/2016 |
| WO | WO-2000/022394 A1 | 4/2000 |
| WO | WO-2011/153587 A1 | 12/2011 |
| WO | WO-2015/042652 A1 | 4/2015 |
| WO | WO-2015/196240 A1 | 12/2015 |
| WO | WO-2016/070220 A1 | 5/2016 |
| WO | WO-2016/154662 A1 | 10/2016 |

OTHER PUBLICATIONS

Extended European Search Report issued in European Patent Application No. 17838201.6, dated Feb. 7, 2020.
First Office Action issued in Chinese Patent Application No. 201780062391.1 dated Nov. 4, 2020.
Second Office Action issued in Chinese Patent Application No. 201780062391.1, dated Jul. 5, 2021.
Office Action issued in Russian Patent Application No. 2019106361, dated Nov. 20, 2020.

* cited by examiner

SENSOR MOUNTING ASSEMBLY

FIELD OF THE INVENTION

The invention relates to the mounting of a sensor and more particularly to a mounting assembly for a temperature sensor.

BACKGROUND OF THE INVENTION

In some devices and particularly home appliances, a temperature sensor is provided on an exterior surface of a device or appliance for the purpose of allowing the sensor to make contact with an external surface of an object or vessel, the temperature of which the sensor is able to detect or measure. In some circumstances, the sensor must have a limited freedom of movement so that optimal surface contact between the sensor and the vessel is achieved. In the case of a temperature sensor, irregular or imperfect contact may result in sub-optimal temperature readings and thus may affect measurement and processes that depend on these readings.

Disclosed in International Patent Publications WO2015042652 and WO2016154662 are apparatus used to forth milk in a jug. The apparatus have temperature sensors that engage the jug to assist in determining the temperature of milk in the jug.

Prior art sensor mounting methods have the disadvantage that they are not adapted to accommodate some misalignment between the sensor and the surface that the sensor contacts.

OBJECTS OF THE INVENTION

It is an object of the present invention to overcome or substantially ameliorate the above disadvantage.

SUMMARY

There is disclosed herein an appliance including a temperature sensor assembly mounted in a chassis, the chassis being configured to releasably receive an item, with the assembly provided to detect the temperature of the item, the assembly including:

a resilient support to be attached to the chassis, and including a mounting that has a longitudinal axis;
a temperature sensor secured in the mounting and extending therealong so as to provide an end portion to be positioned relative to the chassis so as to be located adjacent the item to detect the temperature thereof;
a resilient member associated with the sensor and to urge the sensor to a predetermined position with respect to the chassis; and wherein the resilient support and resilient member provide for movement of the sensor in a direction along said axis, enabling said end portion to accommodate positioning of said item on said chassis, and to urge the sensor assembly into contact with the item.

Preferably the assembly further includes an engaging member engaged with the sensor at a position remote from said end portion.

Preferably the resilient member extends between the chassis and said resilient support, to urge the sensor to said predetermined position.

Preferably said resilient member extends between the engaging member and the chassis, to urge the sensor to said predetermined position.

Preferably wherein said resilient member is resiliently deformed to urge the sensor to the predetermined position.

Preferably wherein said resilient member is a spring.

Preferably said spring provides a force urging the sensor to the predetermined position, with said force increasing with an increase in resilient deformation of the spring.

Preferably wherein said force increases at an increasing rate as the spring is compressed.

Preferably said spring is wound about said longitudinal axis, and has a first end with a diameter, and a second end with a diameter larger than the diameter of said first end.

Preferably wherein the resilience support and the resilient member provide for angular movement of the sensor, the angular movement being about to further axes, the three axes being mutually perpendicular, the movement about the further to axes and the movement in the direction of said longitudinal axis enabling said end portion to accommodate position of said item on said chassis.

Preferably wherein the chassis includes guide portion operatively associated with the sensor to limit angular movement about said further axes.

Preferably wherein said chassis has a surface to receive said item, and said engaging member engages the chassis so that said longitudinal axis is generally perpendicular to said surface when the sensor is at said predetermined position.

Preferably the sensor has at least one slot, and the engaging member at least one flange engaged in the slot to fix the engaging member to the sensor.

Preferably the resilience support includes a stem within which the sensor is located, with the stem having a slot, arranged with the slot of the sensor, so that said flange extends through the slot in the stem and the slot in the sensor.

Preferably the chassis has an abutment, and the engaging member engages the abutment when the engaging member is at a position most remote from said predetermined position.

Preferably the engaging member has a groove into which the resilient member is engaged.

Preferably said engaging member has at least one rib to engage said abutment to aid in maintaining said longitudinal axis generally perpendicular to said surface.

BRIEF DESCRIPTION OF THE DRAWING FIGURES

Preferred forms of the present invention will now be described by way of example with reference to the accompanying drawings, wherein.

DETAILED DESCRIPTION

Figure 1:
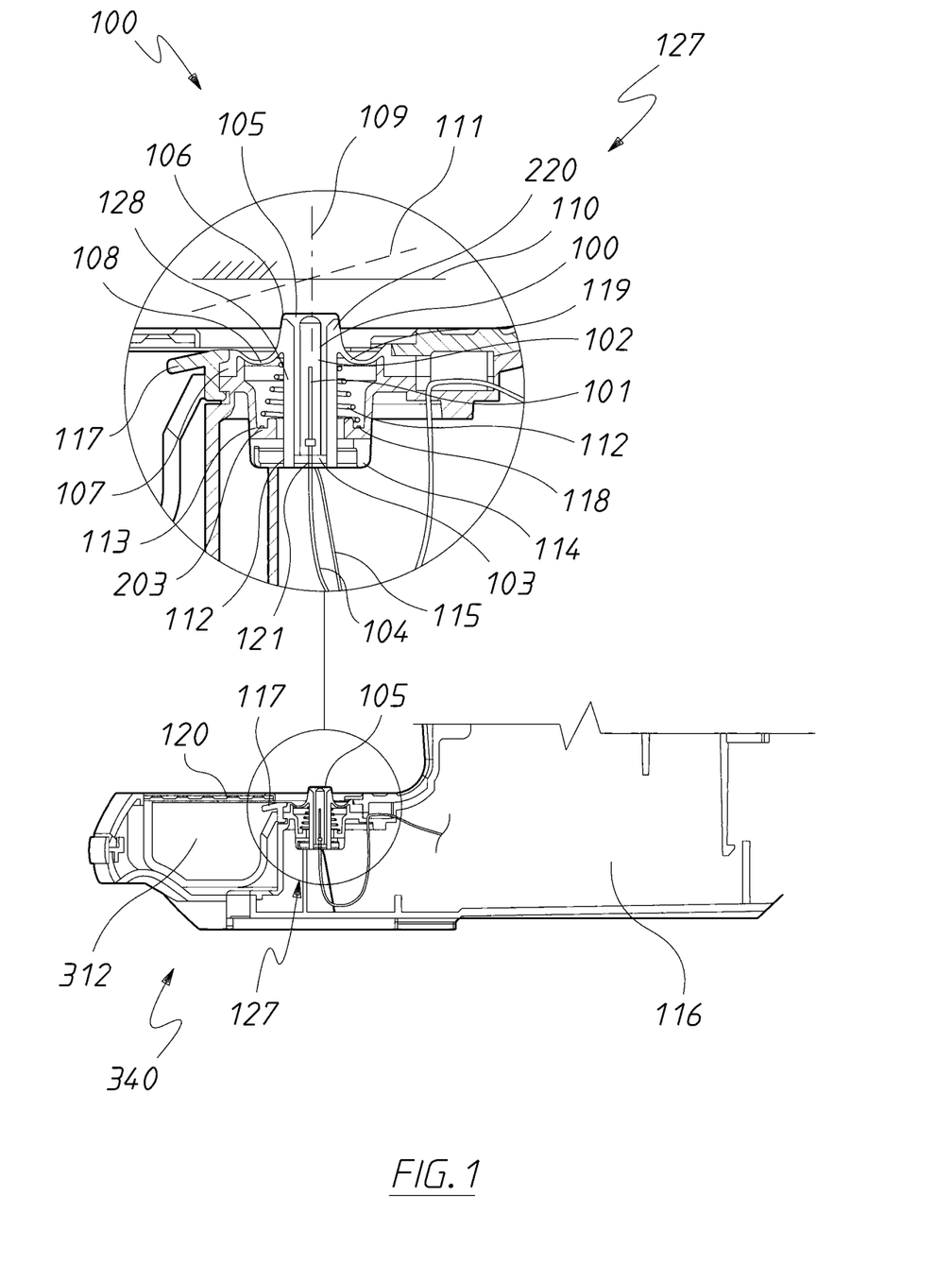
FIG. 1 is a cross sectional view and detail of a sensor mounting assembly.

As shown in FIG. 1, a sensor assembly 127 is illustrated as having a sensor body 100 comprises a cylindrical portion 102 that contains within it a sensor such as an NTC thermistor 101. The sensor assembly is illustrated as part of an appliance. The portion 102 and thermistor 101 and longitudinally elongated as to extend longitudinally along the axis 109. The cylindrical portion 102 has an open lower end 104 allowing the thermistor 101 and its lead wires 104 to be located within the sensor body 100. The sensor body 100 also has a thermally conductive and preferably integral cap 105. The cap 105 may have a chamfered or rounded peripheral rim 106. The upper surface 126 of the cap 105 may be flat or conform to the shape of the object or vessel to be contacted.

The sensor body 100 is supported, in part, by a polymeric gaiter (resilient support) 107 having a flexible diaphragm 108. The diaphragm 108 has a central opening 220 for receiving the sensor body 100. The flexibility of the diaphragm 108 allows the sensor body 100 to be misaligned relative to its normal or resting vertical axis 109. In this way, the upper flat surface 126 of the cap 105 may make optimum surface to surface contact with the exterior surface 111 of a vessel 110, even when the contact surface 111 is either curved or is otherwise a misaligned surface 111 from a plane that is orthogonal to the sensor body's resting (e.g. vertical) axis 109.

In order that the thermistor 101 and sensor body 100 may both reciprocate along the axis 109 and maintain surface contact with the vessel 110, a compression spring 112 urges the diaphragm 108 of the gaiter 107 and sensor body 100 vertically upward along the axis 109. In this example, the spring 112 is tapered from a minimum diameter that fits under the inner diameter of the diaphragm 108, adjacent to the cylindrical part (stem) 128 of the gaiter 107 that surrounds the cylindrical portion 102 of the sensor body 102. The lower extent of the spring 112 has a larger diameter than the upper extent and is retained and restrained by a groove 113 or otherwise in a static restraining collar 118 located below the spring 101.

The diaphragm 108 includes a disc portion 119 and the mounting part 128 extending transverse relative to the portion 119. The part 128 provides a passage 121 within which the body 100 is mounted. The part 128 is resilient deformed to be urged into engagement with the body 100 to at least aid in retaining the body 100 in the part 128.

In this example, the vertically upward movement of the sensor body 100 is limited by a clamp (engaging member) 114. The clamp 114 in this example is generally disk like and mechanically engages a slot 211 in the cylindrical portion 108 of the sensor body 102. The vertically downward movement of the sensor body 100 is limited by a rib or abutment 115 that makes contact with the clamp 114 or the sensor body 100 at the limit of downward vertical travel along the axis 109.

In this example the sensor assembly 126 is located in the base of the milk steaming device or coffee machine having a steam wand 116. The assembly 126 is adjacent to a surface or grille, 117 that supports a jug having the body 110, the underside of which is contacted by the head 105. Runoff from the armature 117 that supports the gaiter 107 flows into a drip tray or drain area 312.

Figure 2:
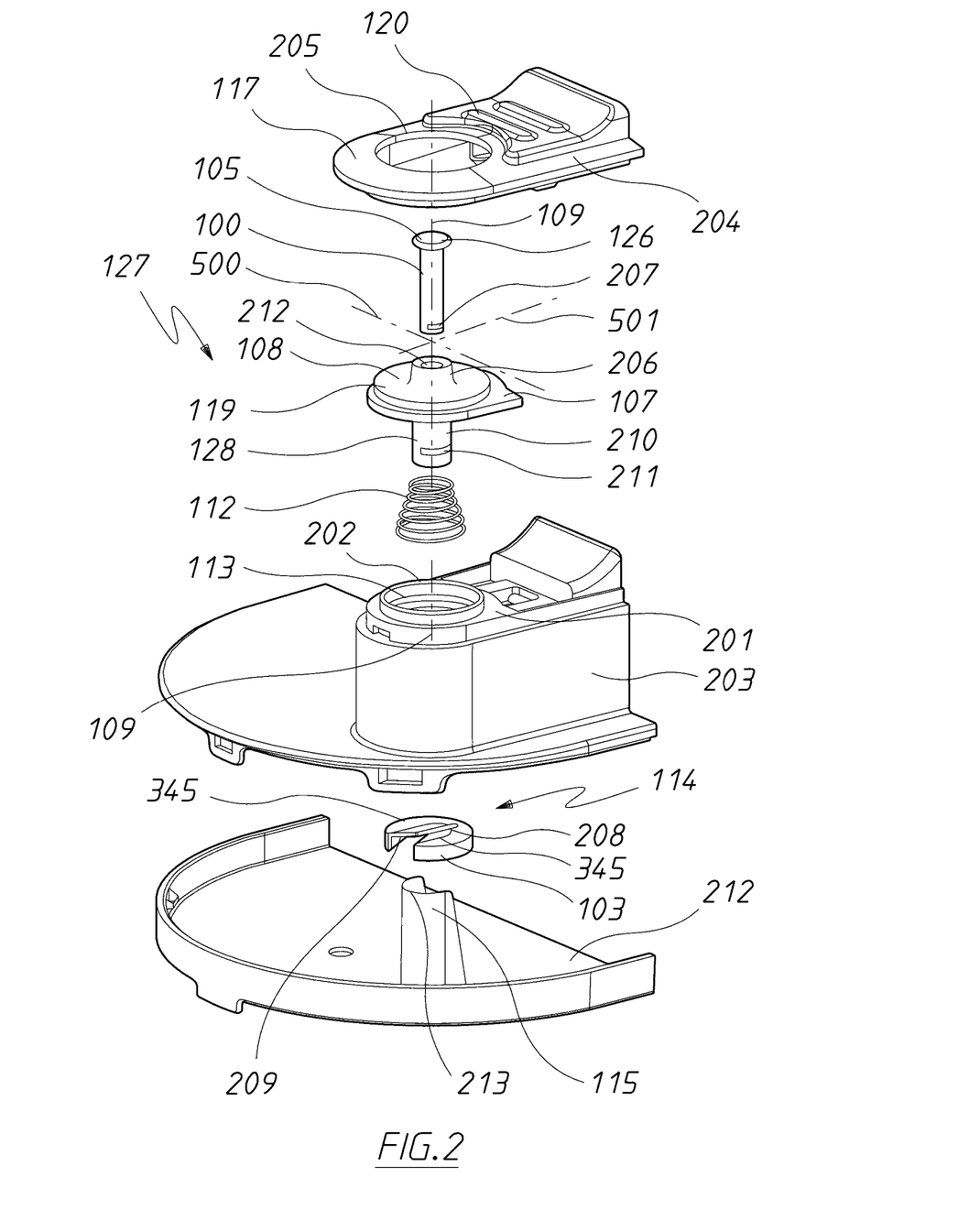
FIG. 2 is an exploded perspective view of the assembly shown in FIG. 1.

A more detailed and exploded perspective view of the device depicted in FIG. 1 is shown in FIG. 2. As shown in FIG. 2, the gaiter 107 is effectively clamped or supported between two static parts. In this example, a lower clamping surface 201 and upstanding rim 202 formed in a chassis portion 203 of the assembly 127 co-operates with an upper part or gaiter armature 204. The gaiter armature 204 has a central opening 205 through which extend at least an upper or neck portion 206 of the gaiter 107 and at least the cap 105 of the sensor body 100.

The cylindrical portion 102 of the sensor body 100 has a slot 207 that is adapted to engage the edges of a second slot 208 formed in the clamp 103. The slot 208 in the clamp 114 may have a tapered or enlarged guide or pilot 209 to facilitate assembly. The lower or cylindrical part 210 of the gaiter 112 may have a cooperating slot 211 that allows the clamp 114 to both access the slot 207 in the sensor body 100 and stabilise the location of the gaiter 107 with respect to the sensor body 100. The clamp 114 has flanges 345 that enter the slots 207 and 208.

As illustrated in FIG. 1 and FIG. 2, the spring 112 is effectively trapped between a retaining part or groove 113 in the chassis 212 and the underside of the gaiter 107. As shown in FIG. 2, a vertical rib or abutment 115 associated with or forming a portion of the base or chassis 212 limits the downward travel of the clamp 103 by making contact with the underside of the clamp 103. In this example, the rib or abutment 115 has an arch shaped or curved upper edge 213 for providing more uniform and stable contact between the underside of the clamp 103 and the abutment 115.

Accordingly, by selection of a spring (resilient member) 112 with a correct modulus and a gaiter 107 with adequate strength and flexibility, the thermistor 101 and sensor body 100 may be displaced vertically and angularly. Thus, the cap 105 of the sensor body 100 will make preferably surface to surface or at least improved contact with the exterior surface 111 of a vessel 110 particularly when the contact surface is not perfectly orthogonal to the vertical axis 109. It will be understood that the spring 112 is selected so that the vessel 110, even when empty or near empty, will lay flat on a supporting surface 120 above which the cap 105 protrudes and not be elevated or otherwise interfered with by the action of the spring 112 on the sensor body 100. Alternatively the gaiter 107 may be affixed or over moulded on to a retaining part such as the armature 117.

In the above described preferred embodiment, the disc portion 119 resiliently deforms to provide for angular movement of the sensor body 100 about the axes 500 and 501. The axes 500 and 501 are perpendicular, with both the axes 500 and 501 being perpendicular to the axis 109.

Angular movement about the axes 500 and 501 is limited by the clearance between the body 100 and the chassis portion 203. The groove 113 provides a passage within which the body 100 is located, with the passage providing a clearance between the body 100 and the chassis portion 203.

Movement along the longitudinal axis 109 is limited by engagement of the chassis portion 203, in one direction, while movement is limited in the other direction along the axis 109 by another portion of the chassis, the abutment 115.

Angular movement about the axes 500 and 501, and longitudinal movement along the axis 109 enables the surface 126 to best adapt to the position and angular inclination of the surface 118, thereby aiding in more accurate sensing of the temperature of the surface 111.

As shown in FIG. 2 the clamp 114 is of disc shaped. The clamp 114 is configured to engage the end extremity of the chassis portion 203, so that when engaged, the axis 109 is perpendicular (vertical) relative to the surface 120. When the body 100 is displaced and moved toward the abutment 115, the clamp 114 engages the abutment 115, by abutting the end surface thereof.

Figure 3:
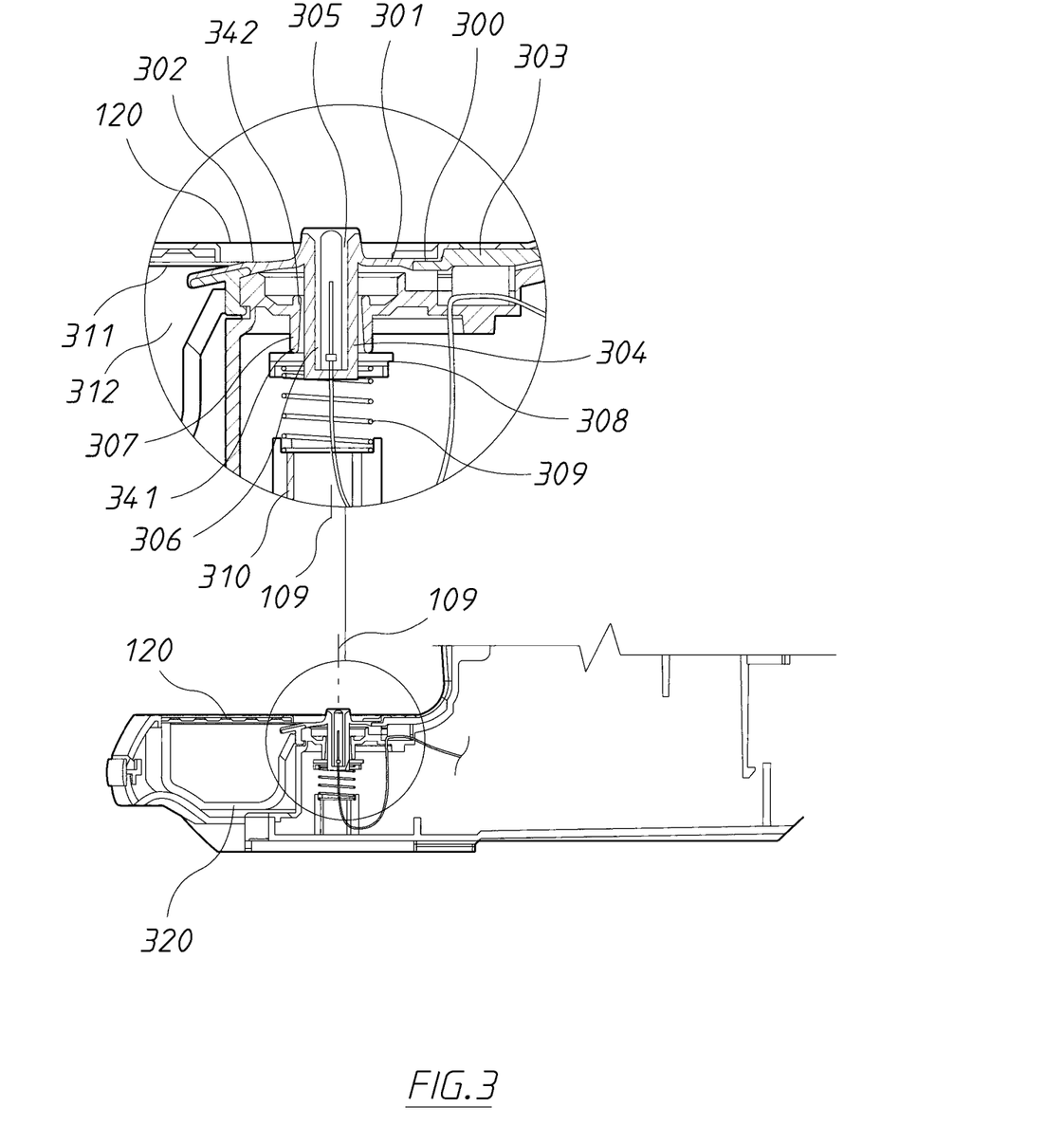
FIG. 3 is a cross sectional view and detail of a second embodiment of a sensor mounting assembly.
Figure 4:
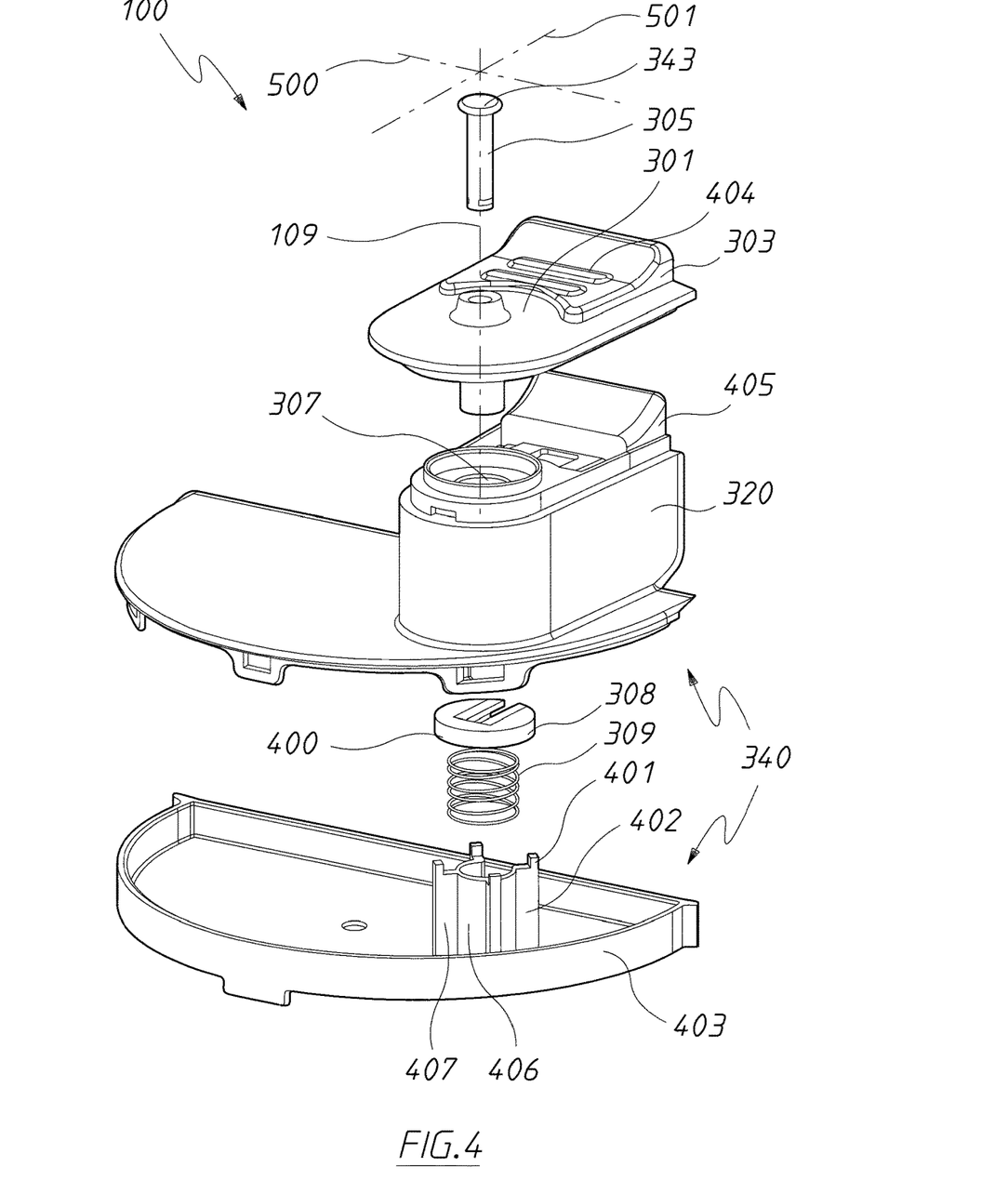
FIG. 4 is an exploded perspective view of the assembly depicted in FIG. 3.

A second exemplarily embodiment is depicted in FIG. 3 and FIG. 4. As shown in FIG. 3, a rim 300 of the diaphragm 301 of a gaiter 302 is affixed to, clamped by or over moulded on to a retaining part such as a fixed gaiter armature 303. The gaiter 302 also has a cylindrical body portion 304 that retains the cylindrical body 305 of the sensor body 306. A fixed part of the device's chassis 340 has an opening, for example a cylindrical or slightly tapered cylindrical guide channel 307. The sensor body 306 and gaiter 302 are slotted (as suggested by FIG. 1 and FIG. 2) to receive a clamp (engaging member) 308. The clamp 308 has details that retain the spring 309 to improve assembly. The clamp 308 is urged upwardly and biased into contact with the lower rim of the guide 307 by a compression spring 309. The compression spring 309 is retained by the underside of the clamp 308 and a spring support 310. The spring support 310 also serves as a limit to the vertical travel of the clamp 308. Because there is a gap between the outer diameter of the gaiter 302 and the inner diameter of the guide or channel 307, the sensor body 306 may be misaligned from its resting vertical axis 109 and may also reciprocate vertically, returning to its rest position depicted in FIG. 3 when the load on it is removed. The channel 307 is also preferably adapted to allow for misalignment of the sensor body 306 from the resting vertical axis 109 by incorporating a draft so that the lower rim diameter is larger than the upper rim diameter.

As shown in FIG. 3, a gap 311 may be formed between the supporting surface 120 and the upper surface of the gaiter 302. This allows liquid to fall into a drip tray or other liquid receiving area 312 located below the supporting surface 120.

As shown in FIG. 4, the gaiter 302 and its diaphragm 301 (convex in this example) may be over moulded on to a fixed gaiter armature 303. The gaiter armature 303 is retained by a portion of the chassis 340 and remains fixed even as the flexible diaphragm 301 flexes to accommodate the movement of the sensor body 305. The clamp 308 has a descending peripheral rim 400 that retains the compression spring 309. The bottom of the spring 309 is retained by an upright rim or post array 401 formed about the upper part of a spring support post 402 that is affixed to or part of a fixed chassis component 403.

As shown in FIG. 4 the clamp 308 is of disc shaped. The clamp 308 is configured so that upon engagement with 341 of the channel 307, the axis 109 is aligned so as generally perpendicular to the surface 120. The clamp 308 is also configured to engage in post array 401, again to arrange the axis 109 so as to be generally perpendicular to the surface 120.

In the example of FIG. 4, the gaiter armature 303 is formed as a separate part and then affixed to or retained by the chassis 340. The diaphragm 301 of the gaiter 302 is recessed with respect to the uppermost surface 404 of the armature 303. The upper portions 404 of the armature 303 correspond to the vertical level of a remainder of a grille or supporting surface 120 (see FIG. 1). In preferred embodiments, the gaiter armature 303 is affixed to a moulded chassis component 405 that also supports the guide or channel 307.

As shown in FIG. 4, the vertical post 402 comprises a "C" shaped channel 406 having vertical rigidizing ribs 407. Each of the ribs 407 may form a shoulder or post 401 for localising and retaining the spring 309. The opening within the "C" shaped cross section of the post 401 ensures that the lower most parts of the sensor body 306 and gaiter 302 are not interfered with when travelling vertically.

It would be appreciated that the gaiter 302 makes sealing contact with the sensor body 100 and does not protrude above the cap 343 of the sensor body 306.

In this embodiment, again angular movement about the axes 500 and 501, and longitudinal movement along the axis 109 enables the cap 343 to best adapt to engaging the position and the inclination of the surface 111.

Further embodiments are disclosed with reference to FIG. 5 through FIG. 8.

Figure 5:
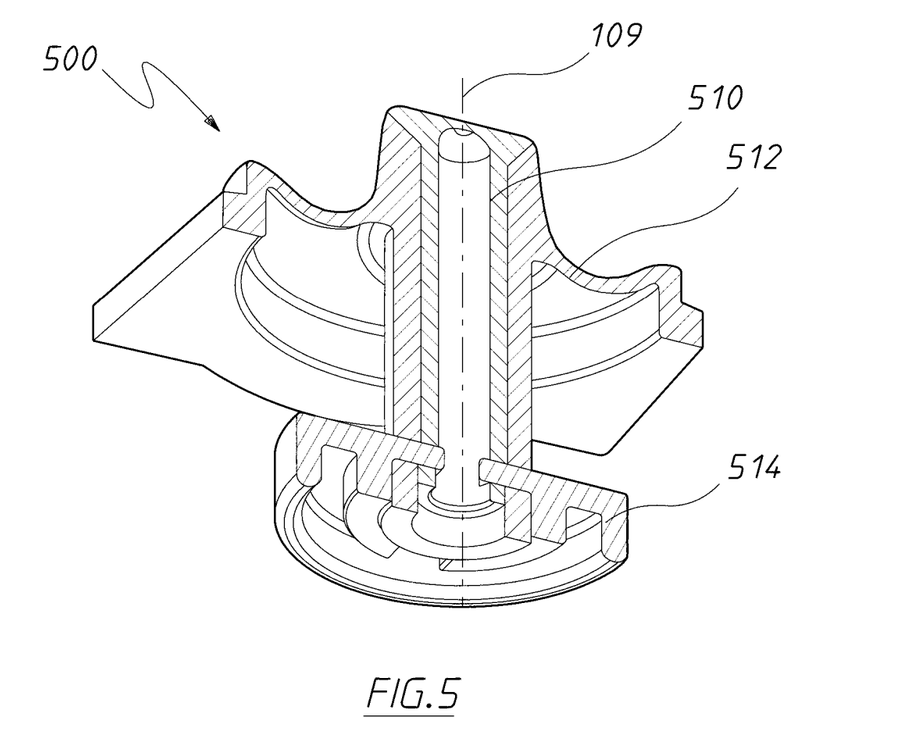
FIG. 5 is a partial cross sectional view and detail of an alternative sensor mounting assembly.
Figure 6:
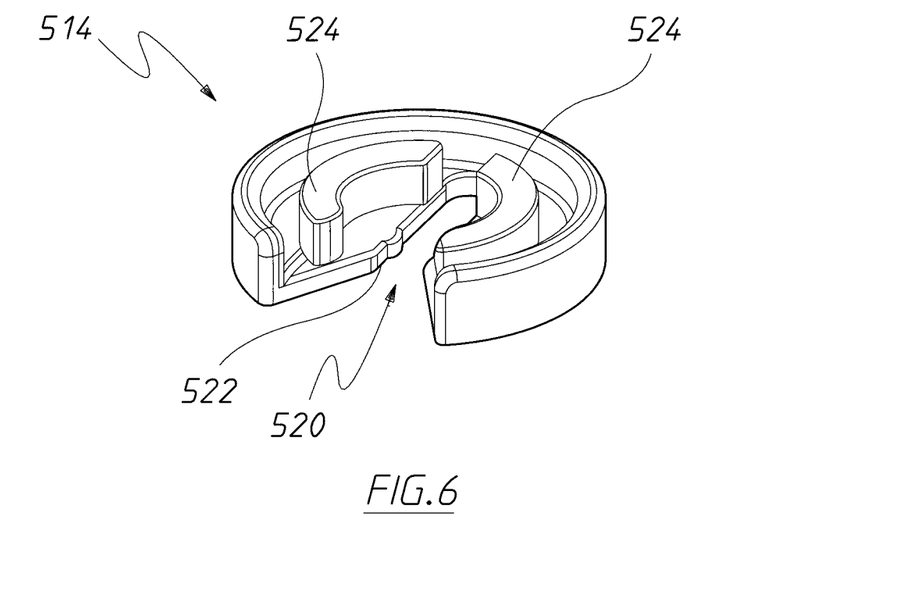
FIG. 6 is a perspective view of a sensor clamp of FIG. 5.

FIG. 5 is a partial cross sectional view and detail of an alternative sensor mounting assembly 500, and FIG. 6 is a perspective view of the sensor clamp of FIG. 5.

In this embodiment, the temperature sensor 510 is located by three elements, the diaphragm (for example, formed of silicone) 512, spring (not shown) and retaining element (or clamp element) 514. Each element retains the temperature sensor 510 in different ways, which act as single design that holds the temperature sensor 510 at the correct rest position while allowing the temperature sensor 510 to deflect or move under influence of an underside surface of a jug (vessel). The diaphragm 512 may be over-moulded over the housing of the temperature sensor 510.

A spring (not shown) is held between the diaphragm 512 and a guide tube in the chassis. The spring provides a bias for holding the temperature sensor 510 against the underside of the jug. The spring tension is preferably tuned to deflect under the combined weight of the jug and any liquid within the jug. The spring can also allow the temperature sensor 510 to rotate or move laterally.

The diaphragm 512 locates the temperature sensor in a supporting surface of the chassis. The form of the resilient diaphragm 512 also the temperature sensor 510 to move without compressing or stretching.

The retaining element (retaining member or clamp) 514, assists with locating the temperature sensor 510 when in a rest position. The spring causes that the retaining element 514 to rise against the bottom surface of the guide tube, while holding the top surface of the temperature sensor 510 parallel to the support surface (or drip tray grill).

The retaining element (or clamp) 514, has an open slot 520 for receiving and retaining the temperature sensor. Two small protrusions 522 can be located on opposing sides of the slot to grip the temperature sensor (including during assembly).

The retaining element (engaging member or clamp) 514, may further include two concentric ribs 524 for retaining the temperature sensor 510 perpendicular to the retaining element 514.

Below the retaining element (or clamp) 514, a stop element (not shown) prevents the thermistor from being over extended which could cause damage to the diaphragm 512.

As clearly illustrated in FIG. 6, the retaining element 514 is generally disc shaped and again is configured to engage the end extremity 341 so as to arrange the axis 109 generally perpendicular to the surface 120. Additionally, the retaining element 514 is configured to engage the guide element 614, again arranging the axis 109 generally perpendicular to the surface 120.

It will be appreciated, for example with reference to FIG. 5 and FIG. 6, that:

(a) the temperature sensor retaining element or clamp 514 has small protrusions 522 that grip the temperature sensor 510 during assembly; and (b) the temperature sensor 510 retaining element 514 has two concentric ribs 524 for maintain the temperature sensor in a substantially perpendicular alignment relative to the element 514.

Figures 7, 8:
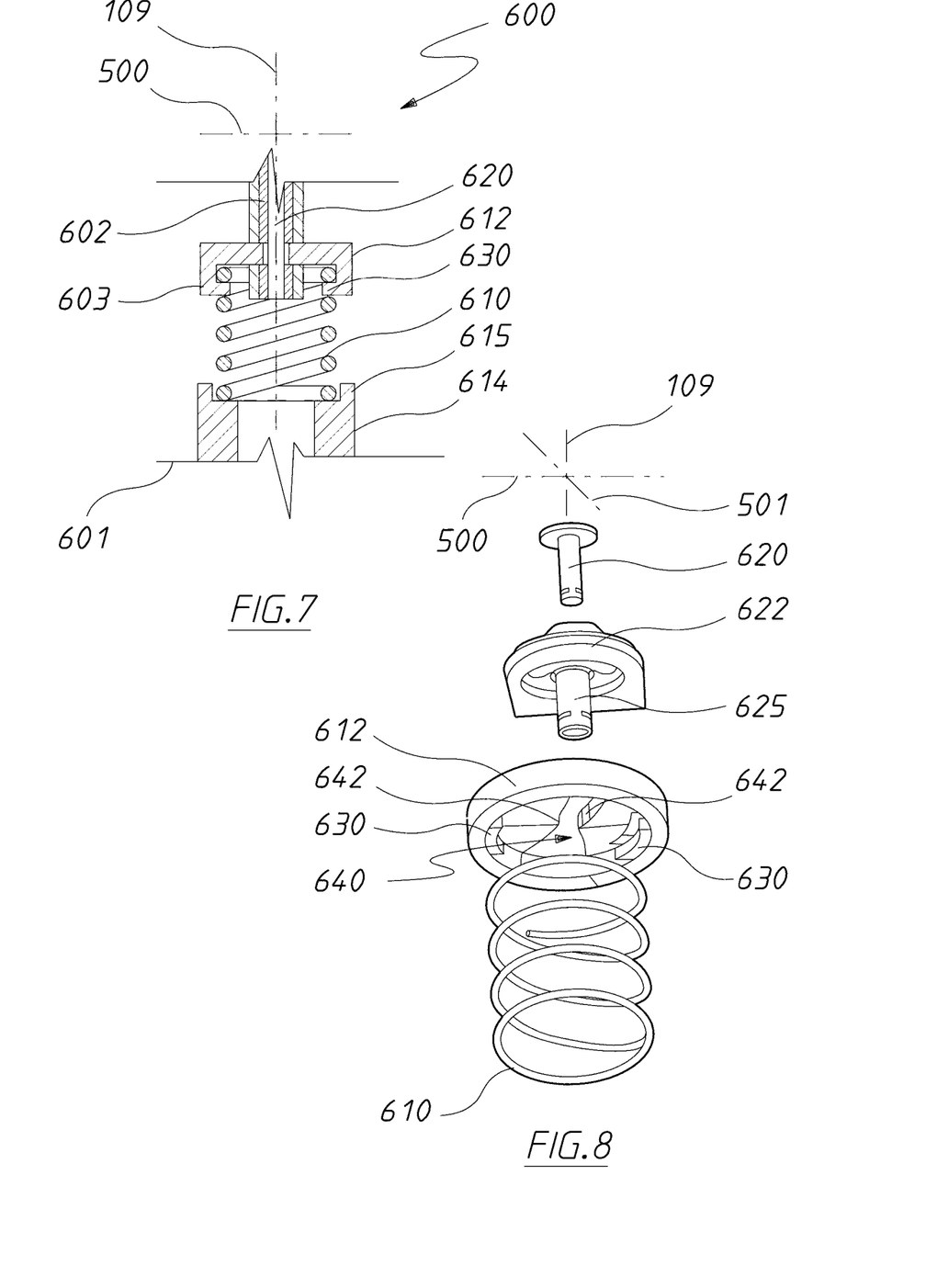
FIG. 7 is a partial cross sectional view and detail of an alternative sensor mounting assembly.
FIG. 8 is an exploded perspective view of the assembly depicted in FIG. 7.

FIG. 7 is a partial cross sectional view and detail of an alternative sensor mounting assembly 600, and FIG. 8 is an exploded perspective view of this assembly 600. In this embodiment, a spring 610 is located below a temperature sensor retaining element 612 and a guide element 614 associated with the chassis 601.

In this embodiment, the temperature sensor 620 (for example a negative temperature coefficient resistive element) is located by three elements, the diaphragm (for example, formed of silicone) 622, spring 610 and retaining element (or clamp element) 612. Each element retains the temperature sensor 620 in different ways, which act as single design that holds the temperature sensor 620 at the correct rest position while allowing the temperature sensor 620 to deflect or move under influence of an underside surface of a jug (vessel). The diaphragm 622 may be over-moulded over the housing 602 of the temperature sensor 510.

The spring 610 is located between a rib detail 615 constructed from the chassis 611 moulding and the retaining element (or clamp element) 612.

The diaphragm 622 locates the temperature sensor 620 in a supporting surface of the chassis. The form of the resilient diaphragm 622 also the temperature sensor 620 to move without compressing or stretching.

The spring 610, provides a force that biases the temperature sensor 620 against the underside of a jug when in use. The spring tension is tuned to deflect under the combined weight of the jug and any liquid within the jug. The spring 610 also allows the temperature sensor 620 to move.

The retaining element (or clamp element) 612, locates the temperature sensor 620 when in a home position. The spring 610 biases the retaining element 612 against a bottom surface of a guide tube, and locates the top surface of the temperature sensor 620 parallel to the drip tray grill. About the edge the retaining element 612 are rib details 630 for retains the spring 610 and resists over extension of the temperature sensor 620. It is beneficial to retain the spring 610 for assisting assembly and resisting separation during applied forces that are angular to the centreline (vertical) of the spring 610 use.

The retaining element (or clamp) 612, has an open slot 640 for receiving and retaining the temperature sensor 620. Two small protrusions 642 can be located on opposing sides of the slot 640 to grip the temperature sensor 620 (including during assembly).

It will be appreciated, for example with reference to FIG. 7 and FIG. 8, that:
(a) the temperature sensor retaining element (or clamp) 612 has small protrusions 642 that grip the shaft 625 of the temperature sensor 620 during assembly;
(b) the edge of the temperature sensor retaining element or clamp 612 (opposite sides) has two small ribs 630 that act to retain the spring 610; and
(c) retaining the spring 610 aids assembly, and resists the spring 610 slipping out from the assembly during forces that are angular to the centreline (vertical) of the spring travel.

In this embodiment again, angular movement about the axes 500 and 501, and longitudinal movement along the axis 109 enables the cap 604 best position itself for position and angular inclination to engage the surface 111.

Although the invention has been described with reference to specific examples, it will be appreciated by those skilled in the art that the invention may be embodied in many other forms.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention.

While the present invention has been disclosed with reference to particular details of construction, these should be understood as having been provided by way of example and not as limitations to the scope of the invention.

The invention claimed is:

1. An appliance comprising: a temperature sensor assembly mounted in a chassis, the chassis being configured to releasably receive an item, with the assembly provided to detect the temperature of the item, the assembly including:
   a resilient support to be attached to the chassis, and including a mounting that has a longitudinal axis;
   a temperature sensor secured in the mounting and extending therealong so as to provide an end portion to be positioned relative to the chassis so as to be located adjacent the item to detect the temperature thereof; and
   a resilient member associated with the sensor to urge the sensor to a predetermined position with respect to the chassis, and the resilient support including a flexible diaphragm having a central opening for receiving the sensor;
   wherein the resilient support and resilient member provide for movement of the sensor in a direction along said axis to enable said end portion to accommodate positioning of said item on said chassis, and to urge the sensor assembly into contact with the item; and
   wherein the resilient support and the resilient member provide an angular movement of the sensor, the angular movement being about two further axes, the longitudinal axis and the two further axes together providing three mutually perpendicular axes, and the movement about the two further axes and the movement in the direction of said longitudinal axis enabling said end portion to accommodate a position of said item on said chassis.

2. The appliance of claim 1, wherein the resilient member extends between the chassis and said resilient support to urge the sensor to said predetermined position.

3. The appliance of claim 1, wherein the chassis includes a guide portion operatively associated with the sensor to limit the angular movement about said two further axes.

4. The appliance of claim 1, wherein the assembly further includes an engaging member engaged with the sensor at a position remote from said end portion.

5. The appliance of claim 4, wherein said chassis has a surface to receive said item, and said engaging member engages the chassis so that said longitudinal axis is generally perpendicular to said surface when the sensor is at said predetermined position.

6. The appliance of claim 4, wherein the engaging member has a groove into which the resilient member is engaged.

7. The appliance of claim 1, wherein said resilient member is resiliently deformed to urge the sensor to the predetermined position.

8. The appliance of claim 7, wherein said resilient member is a spring.

9. The appliance of claim 8, wherein said spring is wound about said longitudinal axis, and has a first end with a diameter, and a second end with a diameter larger than the diameter of said first end.

10. The appliance of claim 8, wherein said spring provides a force urging the sensor to the predetermined position, with said force increasing with an increase in resilient deformation of the spring.

11. The appliance of claim 10, wherein said force increases at an increasing rate as the spring is compressed.

12. An appliance comprising: a temperature sensor assembly mounted in a chassis, the chassis being configured to releasably receive an item, with the assembly provided to detect the temperature of the item, the assembly including:
a resilient support to be attached to the chassis, and including a mounting that has a longitudinal axis;
a temperature sensor secured in the mounting and extending therealong so as to provide an end portion to be positioned relative to the chassis so as to be located adjacent the item to detect the temperature thereof; and
a resilient member associated with the sensor to urge the sensor to a predetermined position with respect to the chassis, and the resilient support including a flexible diaphragm having a central opening for receiving the sensor;
wherein the resilient support and resilient member provide for movement of the sensor in a direction along said axis to enable said end portion to accommodate positioning of said item on said chassis, and to urge the sensor assembly into contact with the item;
wherein the assembly further includes an engaging member engaged with the sensor at a position remote from said end portion; and
wherein said resilient member extends between the engaging member and the chassis to urge the sensor to said predetermined position.

13. An appliance comprising:
a temperature sensor assembly mounted in a chassis, the chassis being configured to releasably receive an item, with the assembly provided to detect the temperature of the item, the assembly including:
a resilient support to be attached to the chassis, and including a mounting that has a longitudinal axis;
a temperature sensor secured in the mounting and extending therealong so as to provide an end portion to be positioned relative to the chassis so as to be located adjacent the item to detect the temperature thereof; and
a resilient member associated with the sensor to urge the sensor to a predetermined position with respect to the chassis;
wherein the resilient support and resilient member provide for movement of the sensor in a direction along said axis to enable said end portion to accommodate positioning of said item on said chassis and to urge the sensor assembly into contact with the item;
wherein the assembly further includes an engaging member engaged with the sensor at a position remote from said end portion;
wherein said chassis has a surface to receive said item, and said engaging member engages the chassis so that said longitudinal axis is generally perpendicular to said surface when the sensor is at said predetermined position; and
wherein the sensor has at least one slot, and the engaging member has at least one flange engaged in the slot to fix the engaging member to the sensor.

14. The appliance of claim 13, wherein the resilient support includes a stem within which the sensor is located, the stem having a slot arranged with the slot of the sensor so that said at least one flange extends through the slot in the stem and the slot in the sensor.

15. An appliance comprising:
a temperature sensor assembly mounted in a chassis, the chassis being configured to releasably receive an item, with the assembly provided to detect the temperature of the item, the assembly including:
a resilient support to be attached to the chassis, and including a mounting that has a longitudinal axis;
a temperature sensor secured in the mounting and extending therealong so as to provide an end portion to be positioned relative to the chassis so as to be located adjacent the item to detect the temperature thereof; and
a resilient member associated with the sensor to urge the sensor to a predetermined position with respect to the chassis;
wherein the resilient support and resilient member provide for movement of the sensor in a direction along said axis to enable said end portion to accommodate positioning of said item on said chassis and to urge the sensor assembly into contact with the item;
wherein the assembly further includes an engaging member engaged with the sensor at a position remote from said end portion;
wherein said chassis has a surface to receive said item, and said engaging member engages the chassis so that said longitudinal axis is generally perpendicular to said surface when the sensor is at said predetermined position; and
wherein the chassis has an abutment, and the engaging member engages the abutment when the engaging member is at a position most remote from said predetermined position.

16. The appliance of claim 15, wherein said engaging member has at least one rib to engage said abutment to aid in maintaining said longitudinal axis generally perpendicular to said surface.

* * * * *